US008806503B2

(12) United States Patent
Becchi et al.

(10) Patent No.: US 8,806,503 B2
(45) Date of Patent: Aug. 12, 2014

(54) METHOD AND SYSTEM FOR MEMORY AWARE RUNTIME TO SUPPORT MULTITENANCY IN HETEROGENEOUS CLUSTERS

(75) Inventors: Michela Becchi, Columbia, MO (US); Kittisak Sajjapongse, Columbia, MO (US); Srimat T. Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 380 days.

(21) Appl. No.: 13/357,087

(22) Filed: Jan. 24, 2012

(65) Prior Publication Data

US 2012/0192198 A1    Jul. 26, 2012

Related U.S. Application Data

(60) Provisional application No. 61/435,454, filed on Jan. 24, 2011, provisional application No. 61/510,514, filed on Jul. 22, 2011.

(51) Int. Cl.
| | |
|---|---|
| *G06F 9/455* | (2006.01) |
| *G06F 9/46* | (2006.01) |
| *G06F 12/10* | (2006.01) |
| *G06T 1/60* | (2006.01) |
| *G06F 12/02* | (2006.01) |
| *G06F 9/50* | (2006.01) |

(52) U.S. Cl.
CPC .......... *G06F 12/0284* (2013.01); *G06F 12/109* (2013.01); *G06F 9/5016* (2013.01); *G06T 1/60* (2013.01)
USPC ......................................... 718/104; 718/105

(58) Field of Classification Search
None
See application file for complete search history.

(56) References Cited

U.S. PATENT DOCUMENTS

| | | | | |
|---|---|---|---|---|
| 8,051,423 | B2* | 11/2011 | Amin | 718/104 |
| 2007/0180197 | A1* | 8/2007 | Wright et al. | 711/141 |
| 2008/0256330 | A1* | 10/2008 | Wang et al. | 712/24 |
| 2009/0055596 | A1* | 2/2009 | Wallach et al. | 711/141 |
| 2010/0180101 | A1* | 7/2010 | Trumler et al. | 712/30 |
| 2013/0173894 | A1* | 7/2013 | Yan et al. | 712/228 |

OTHER PUBLICATIONS

Becchi et al., "Enabling Legacy Applications on Heterogeneous Platforms", Jun. 2010.*
Becchi et al., "Data-Aware Scheduling of Legacy Kernels on Heterogeneous Platforms with Distributed Memory", Jun. 13, 2010.*
Becchi et al., "Dynamic Thread Assignment on Heterogeneous Multiprocessor Architectures", May 3, 2006.*

* cited by examiner

*Primary Examiner* — Meng An
*Assistant Examiner* — Bradley Teets
(74) *Attorney, Agent, or Firm* — Joseph Kolodka

(57) ABSTRACT

The invention solves the problem of sharing many-core devices (e.g. GPUs) among concurrent applications running on heterogeneous clusters. In particular, the invention provides transparent mapping of applications to many-core devices (that is, the user does not need to be aware of the many-core devices present in the cluster and of their utilization), time-sharing of many-core devices among applications also in the presence of conflicting memory requirements, and dynamic binding/binding of applications to/from many-core devices (that is, applications do not need to be statically mapped to the same many-core device for their whole lifetime).

2 Claims, 4 Drawing Sheets

METHOD AND SYSTEM FOR MEMORY AWARE RUNTIME TO SUPPORT MULTITENANCY IN HETEROGENEOUS CLUSTERS

This application claims the benefit of both U.S. Provisional Application No. 61/435,454, entitled, "Heterogenous cluster Visualization", filed Jan. 24, 2011, and U.S. Provisional Application No. 61/510,514, entitled, "Virtual Memory Based Runtime to support Multitenancy in Clusters with Many-Cores", filed Jul. 22, 2011, of which the contents of all are incorporated herein by reference.

BACKGROUND OF THE INVENTION

The present invention relates generally to multiprocessing systems and more particularly to memory-aware runtime to support multitenancy in heterogeneous clusters.

Many-core processors are increasingly becoming part of high performance computing (HPC) clusters. Within the last two to three years general processing units GPUs have emerged as a means to achieve extreme scale, cost-effective, and power-efficient high performance computing. The peak single-precision performance of the latest GPU from NVIDIA—the Tesla C2050/C2070 card—is more than 1 Teraflop, resulting in a price to performance ratio of $2-4 per Gigaflop. GPUs can offer up to 20 times better performance per watt than multi-core CPUs. Meanwhile, Intel has announced the upcoming release of the Many Integrated Core processor (Intel® MIC), with peak performance of 1.2 Teraflops. Early benchmarking results on molecular dynamics and linear algebra applications have been demonstrated at the International Supercomputing Conference, Hamburg, Germany, in June 2011.

The following references are referred to in the further background discussion.

[1] J. Nickolls, I. Buck, M. Garland, and K. Skadron. 2008. Scalable Parallel Programming with CUDA. In *Queue* 6, 2 (March 2008), 40-53.
[2] V. Gupta, A. Gavrilovska, K. Schwan, H. Kharche, N. Tolia, V. Talwar, and P. Ranganathan. 2009. GViM: GPU-accelerated virtual machines. In *Proceedings of HPCVirt '09*. ACM, New York, N.Y., USA, 17-24.
[3] L. Shi, H. Chen, and J. Sun. 2009. vCUDA: GPU accelerated high performance computing in virtual machines. In *Proceedings of IPDPS '09*, Washington, D.C., USA, 1-11.
[4] J. Duato, A. J. Peña, F. Silla, R. Mayo, and E. S. Quintana-Ortí. 2010. rCUDA: Reducing the number of GPU-based accelerators in high performance clusters. In *Proc. of HPCS '10*, pages 224-231, June-July 2010.
[5] G. Giunta, R. Montella, G. Agrillo, and G. Coviello. 2010. A GPGPU transparent virtualization component for high performance computing clouds. In *Proc. Euro-Par 2010*, Heidelberg, 2010.
[6] V. Ravi, M. Becchi, G. Agrawal, and S. Chakradhar. 2011. Supporting GPU sharing in cloud environments with a transparent runtime consolidation framework. In *Proceedings of HPDC '11*. ACM, New York, N.Y., USA, 217-228

The NVIDIA's CUDA runtime [1] provides very basic mechanisms for applications to time-share a GPU. In particular, by associating CUDA contexts to applications and serving CUDA calls from different applications in the order they arrive, the CUDA runtime allows concurrent applications to time-share a GPU. However, since the CUDA runtime preallocates a certain amount of GPU memory to each CUDA context and does not offer memory swapping capabilities between CPU and GPU, the described time-sharing mechanism works only: (i) in the absence of conflicting memory requirements among concurrent applications, and (ii) for a restricted number of concurrent applications. Further, the CUDA runtime forces explicit procurement of GPU devices to application (that is, there is no transparency in the application-to-GPU mapping and scheduling process).

GViM [2], vCUDA [3], rCUDA [4] and gVirtuS [5] are runtime systems that use the split-driver model to allow visibility of GPUs from within Virtual Machines. In addition, all these proposals but gVirtuS abstract the underlying GPUs from the end-users (thus preventing explicit procurement of GPU resources to applications). However, none of these proposals offer GPU sharing and dynamic binding/unbinding of applications to/from GPUs.

The NVIDIA's CUDA runtime [1] provides very basic mechanisms for applications to time-share a GPU. In particular, by associating CUDA contexts to applications and serving CUDA calls from different applications in the order they arrive, the CUDA runtime allows concurrent applications to time-share a GPU. However, since the CUDA runtime preallocates a certain amount of GPU memory to each CUDA context and does not offer memory swapping capabilities between CPU and GPU, the described time-sharing mechanism works only: (i) in the absence of conflicting memory requirements among concurrent applications, and (ii) for a restricted number of concurrent applications. Further, the CUDA runtime forces explicit procurement of GPU devices to application (that is, there is no transparency in the application-to-GPU mapping and scheduling process).

The proposal in [6] explores kernel consolidation across applications as a means to time-share and space-share GPUs. However, the work assumes that concurrent applications fit the memory capacity of the GPU. Further, it does not allow dynamic binding/unbinding of applications to/from GPUs.

Accordingly, there is a need to provide sharing in the presence of conflicting memory requirements, and dynamic binding/unbinding of applications to/from many-core devices.

BRIEF SUMMARY OF THE INVENTION

The invention is directed to a system for sharing many-core devices among concurrent applications running on a heterogeneous cluster, the system includes a connection manager for receiving and enqueuing many-core calls coming from concurrent applications, virtual-many-cores that issue calls to many-core devices, every application thread being mappable to a virtual-many-core, and multiple virtual-many-cores capable of being associated to the same many-core device, said virtual-many-cores allowing controlled time-sharing of many-core devices, a dispatcher for monitoring available many-core devices and associating application threads to said virtual-many-cores for enabling effectively scheduling applications onto many-core devices and controlling amount of many-core sharing, and a memory manager for providing a virtual memory abstraction for the many-core devices, said memory manager enabling delaying all memory operations targeting the many-core processor until the data are required, keeping a shadow of the many-core device memory on the host, and delaying application-to-many-core device binding, and making such binding dynamic.

In an alternative aspect, the invention is directed to a method for sharing many-core devices among concurrent applications running on a heterogeneous cluster, the method include receiving and enqueuing many-core calls coming from concurrent applications, issuing calls to many-core devices, every application thread being mappable to a virtual-many-core, and multiple virtual-many-cores capable of being associated to the same many-core device, said virtual-many-cores allowing controlled time-sharing of many-core devices, monitoring available many-core devices and associating application threads to said virtual-many-cores for enabling effectively scheduling applications onto many-core devices and controlling amount of many-core sharing, and providing a virtual memory abstraction for the many-core devices, said memory manager enabling delaying all memory operations targeting the many-core processor until the data are required, keeping a shadow of the many-core device memory on the host, and delaying application-to-many-core device binding, and making such binding dynamic.

These and other advantages of the invention will be apparent to those of ordinary skill in the art by reference to the following detailed description and the accompanying drawings.

DETAILED DESCRIPTION

The present invention is directed to solving the problem of sharing many-core devices (e.g. GPUs) among concurrent applications running on heterogeneous clusters. In particular, the invention provides transparent mapping of applications to many-core devices (that is, the user does not need to be aware of the many-core devices present in the cluster and of their utilization), time-sharing of many-core devices among applications also in the presence of conflicting memory requirements, and dynamic binding/binding of applications to/from many-core devices (that is, applications do not need to be statically mapped to the same many-core device for their whole life-time).

Figure 1:
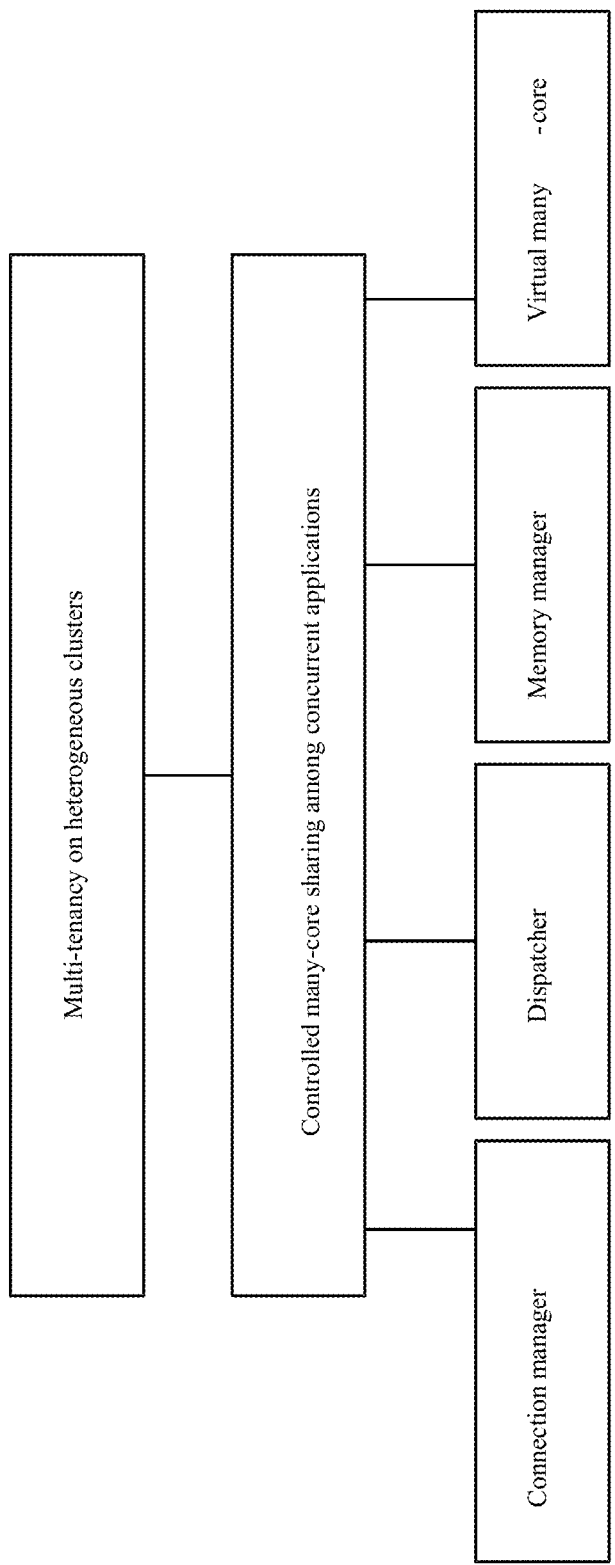
FIG. 1 is a high level block diagram f key aspects of the present invention.
Figure 2:
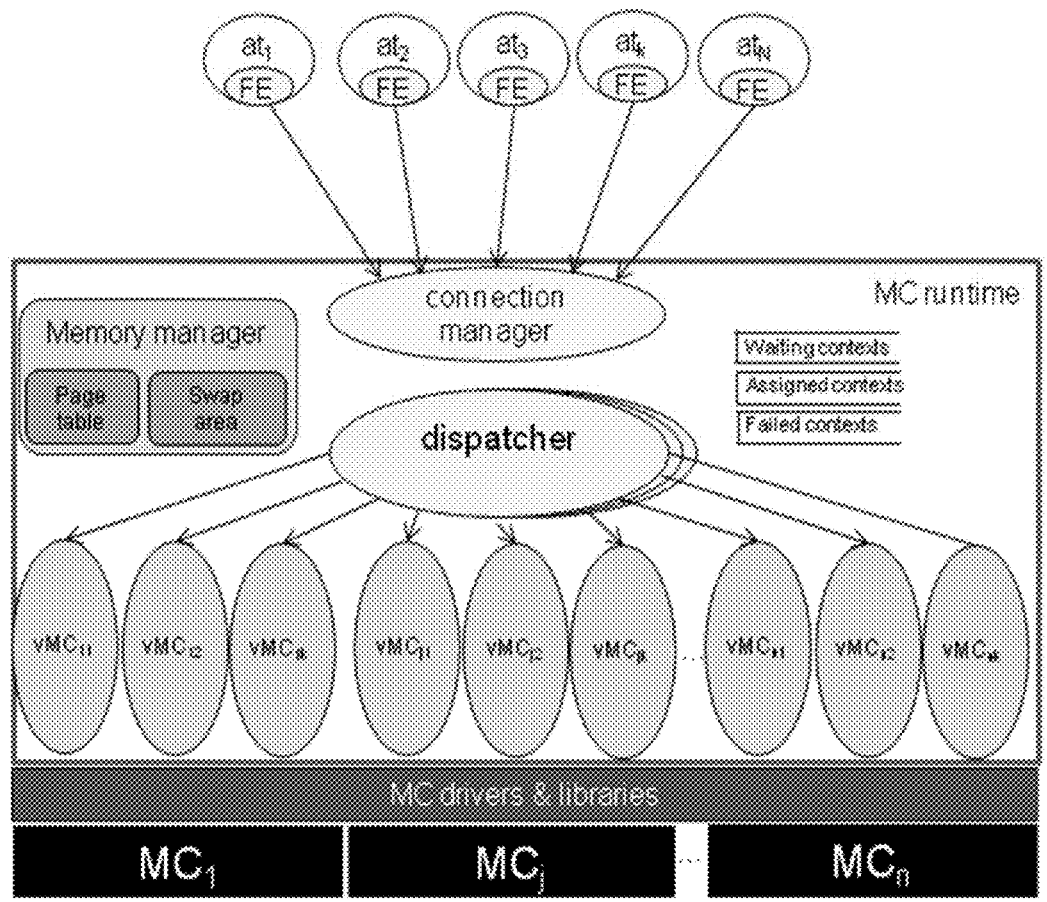
FIG. 2 shows a configuration of an exemplary system for implementing the inventive method.

The invention offers effective many-core sharing (even in the presence of conflicting memory requirements) that allows better resource utilization and, as a consequence, better performance The invention uses a frontend library to intercept all calls directed to many-core devices and redirect them to the system. The function noted above is implemented by the invention through the interaction of the following components (see FIGS. 1 and 2): A Connection Manager component receives and enqueues many-core calls coming from concurrent applications. A Virtual-Many-cores (vMCs) aspect proxy processes that issue calls to many-core devices. Every application thread can be mapped to a vMC, and multiple vMCs can be associated to the same many-core device: this mechanism allows controlled time-sharing of many-core devices. A Dispatcher component performs the following tasks: (i) monitors available many-core devices, and (ii) associates application threads to vMCs, thus effectively scheduling applications onto many-core devices and controlling the amount of many-core sharing. A Memory manager component provides a virtual memory abstraction for the many-core devices. This component allows: (i) delaying all memory operations targeting the many-core processor until the data are required, (ii) keeping a shadow of the many-core device memory on the host, (iii) delaying application-to-many-core device binding, and making such binding dynamic.

Applicants again refer again to FIG. 2, which shows an internal configuration of an exemplary system for implementing the inventive method. Virtual many-cores (vMC) issue calls to the many-core processors. Each application thread ($at_j$) can be associated to a vMC. We say that an application thread is bound to a many-core device when it is associated to a vMC on that particular device; application threads are unbound when they are not associated to any vMC. Bound application threads are serviced by the corresponding vMC. Each many-core can be associated multiple vMCs, thus allowing controlled many-core sharing among application threads. A connection manager queues requests coming from application threads. The dispatcher schedules application threads onto many-core devices by binding them to vMCs, and interact with the memory manager to handle memory operations.

Figure 3:
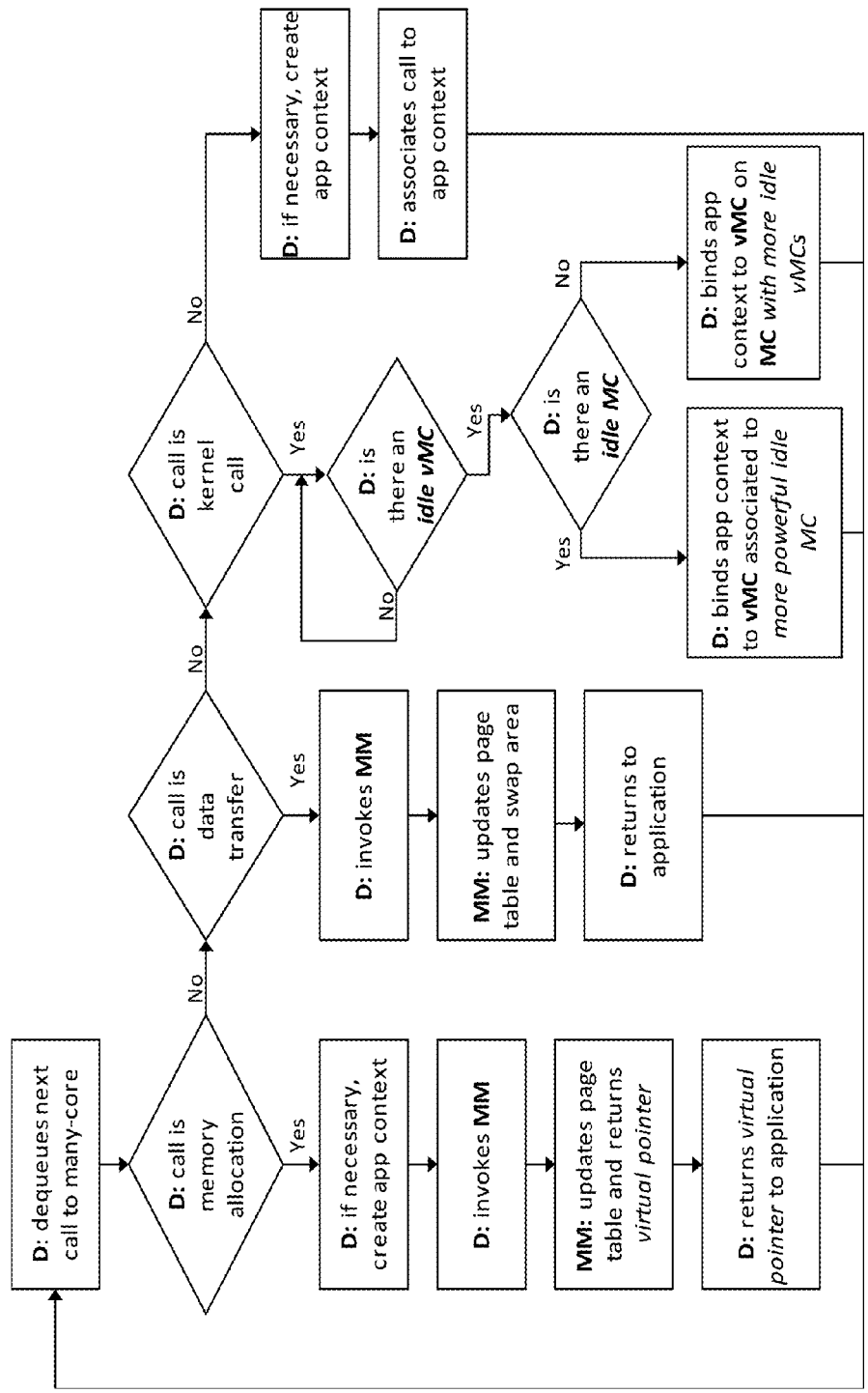
FIG. 3 is a diagram of a dispatcher aspect shown in FIG. 2, in accordance with the invention.

Referring now to FIG. 3, there is shown a diagram for the dispatcher aspect of the inventive method. More specifically, the diagram shows the basic execution loop of the dispatcher, and its interactions with the other components. In the block diagram, we use the following abbreviations: D for the dispatcher, MM for the memory manager, vMC for the virtual many-core, and MC for the many-core device.

The dispatcher dequeues function calls directed to many-core devices (which are queued by the connection manager and may come from different application threads). Each call contains an indication of the issuing application thread. Internally, the system associates an application context to each application thread. Each application context is associated a queue of issued function calls to be processed, and some areas in the page table and in the swap area of the memory manager.

The dispatcher operates as follows. Memory allocation requests are passed to the memory manager, which does not perform any memory allocation on the many-core device but, instead, creates virtual pointers and returns them to the application thread. Similarly, data transfers are passed to the memory manager, which uses the information to update its internal tables. Real data transfers between CPU and many-core devices are delayed to when data are required (that is, to kernel calls). Kernel calls result into binding application threads to many-core devices, by associating them to vMCs. In this process, the dispatcher will favor idle many-core devices (prioritizing the ones with higher compute capabilities). If all many-core devices are busy, then the dispatcher will tend to evenly distribute the load.

A vMC is idle until an application context is associated (or bound) to it. When this happens, the vMC will start processing the function calls within the application context (and issuing them to the many-core driver). This process is shown in FIG. 4, which is a diagram of the virtual many-core (vMC) process.

Figure 4:
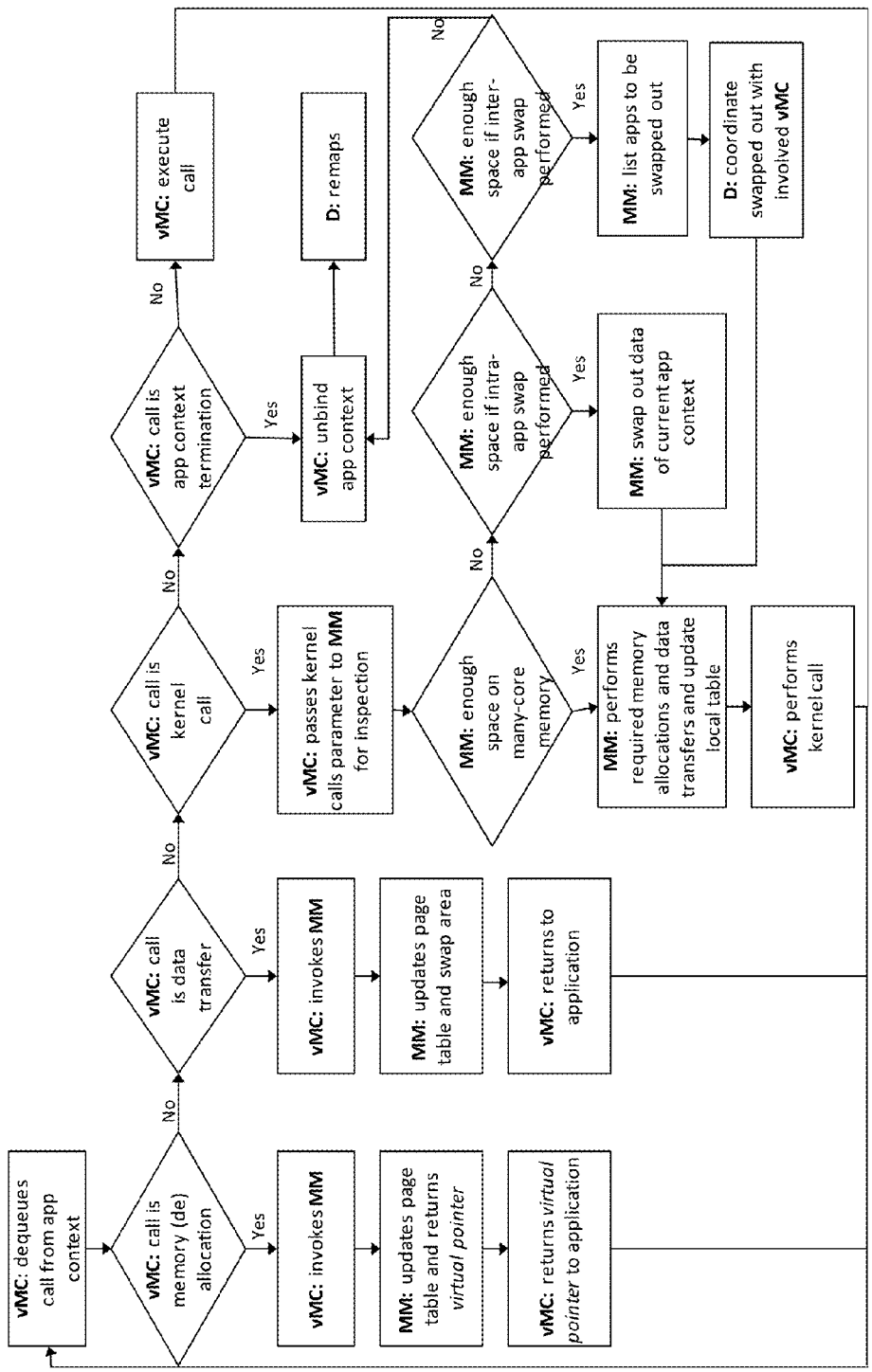
FIG. 4 is a diagram of the virtual many-core aspect (vMC) shown in FIG. 2, in accordance with the invention.

As can be seen in FIG. 4, memory operations (allocations, de-allocations and data transfers) are again handled through the interaction with the memory manager. Again, the memory manager delays all memory operations on the many-core device, and responds to the application calls by using virtual pointers and updating internal tables.

The bulk of the processing happens when a kernel call is encountered. In this case, the vMC will inspect the kernel call and pass the list of parameters used by the kernel to the memory manager. The memory manager will operate as follows.

(1) If the many-core processor has enough device memory to handle the list of parameters, then the required memory allocations and data transfers will be performed, so that the vMC will be able to process the kernel call.

(2) Otherwise, the memory manager will determine whether enough device memory can be made available by de-allocating data used by the application thread but not required by the current kernel call. In this case, the memory manager will swap those data to CPU (intra-application swap), allocate and transfer the data required by the current kernel call, and allow the vMC to perform the kernel invocation.

(3) If this is not possible, the memory manager will consider requiring other application threads mapped onto the same many-core device to swap their data out of the device memory (inter-application swap). This operation requires the intervention of the dispatcher, which will coordinate the involved vMCs and can be programmed with different swapping policies. When enough memory is freed, the memory manager and the vMC will proceed as in (1).

(4) If the memory requirement exceeds the capacity of the current many-core processor, the application context is unbound. In this situation, the vMC will become idle. Similarly, the vMC will become idle when the application thread is terminated. When a vMC becomes idle, the dispatcher is invoked. Different scheduling schemes can be used (for instance, the dispatcher may migrate application threads from less to more capable devices when the latter become idle).

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A system containing a heterogeneous cluster of many-core devices, wherein the many-core devices are physical hardware, said system comprising:

virtual-many-cores which execute concurrent applications, wherein the virtual-many-cores are dynamically bound to the many-core devices by a dispatcher, the virtual-many-cores allowing controlled time-sharing of the many-core devices;

a connection manager for receiving and enqueuing calls from the concurrent applications, wherein a call is either a memory allocation call, a data transfer call or a kernel call;

a memory manager which maintains memory allocation including a page table and swap area; and the dispatcher dequeues the calls and based on whether the call is a memory allocation call, then the dispatcher invokes the memory manager to allocate memory to an application from which the call originated, update the page table and returns a virtual pointer to the allocated memory to the application from which the call originated;

if not a memory allocation call whether the call is a data transfer call, then the dispatcher invokes the memory manager to update the page table and swap area;

if not a data transfer call whether the call is a kernel call, then the dispatcher dynamically binds a virtual-many-core, associated with a concurrent application from which the call originated, to a many-core device of the many-core devices, wherein the memory manager de-allocates data used by the concurrent application from which the call originated but not required by the kernel call and allocates the data to another concurrent application.

2. The system of claim 1, wherein when the dispatcher dynamically binds the virtual-many-core associated with a concurrent application from which the call originated to a many-core device of the many-core devices it favors idle many-core devices and prioritizes many-core devices with higher compute capabilities, and if all of the many core-devices are busy, the dispatcher evenly distributes the virtual-many-cores.

* * * * *